United States Patent [19]

Sasaki et al.

[11] Patent Number: 5,279,910
[45] Date of Patent: Jan. 18, 1994

[54] BATTERY

[75] Inventors: Takashi Sasaki; Isao Ishigaki, both of Gunma; Kazunari Takeda, Osaka; Shyuiti Izuti, Shiga; Tomohiko Noda, Osaka, all of Japan

[73] Assignees: Japan Atomic Energy Research Institute; Yuasa Battery Co., Ltd., Japan

[21] Appl. No.: 922,751

[22] Filed: Jul. 31, 1992

[30] Foreign Application Priority Data

Aug. 1, 1991 [JP] Japan .................................. 3-193233

[51] Int. Cl.$^5$ .............................................. H01M 4/60
[52] U.S. Cl. ...................................... 429/213; 429/192; 429/218
[58] Field of Search ................. 429/212, 213, 218, 192

[56] References Cited

U.S. PATENT DOCUMENTS

| | | | |
|---|---|---|---|
| 4,851,308 | 7/1989 | Akhtar | 429/213 X |
| 4,865,932 | 9/1989 | Masuda et al. | 429/213 X |
| 5,139,901 | 8/1992 | Kawaguchi et al. | 429/212 X |

Primary Examiner—Anthony Skapars

[57] ABSTRACT

The improved battery for reversible operation at ambient temperature comprises a negative electrode, a composite positive electrode which is composed of an ion-conductive high-molecular weight compound that has at least one ionic compound dissolved therein and that has a polyether structure and ion conductivity, an electrochemically active material and, optionally, an electron conductive material, and an electrolyte which is made of an ion-conductive high-molecular weight compound that has at least one ionic compound dissolved therein and that has a polyether structure and ion conductivity. The improvement is such that said composite positive electrode and said electrolyte are formed by exposure to an active radiation such as ultraviolet rays or ionizing radiation. Thanks to the improvement in electrolyte and positive electrode, the battery can be fabricated with great ease, is entirely free from the possibility of electrolyte leakage and has high long-term reliability and safety.

4 Claims, 2 Drawing Sheets

BATTERY

BACKGROUND OF THE INVENTION

This invention relates to a battery that operates reversibly at ambient temperature. More specifically, this invention relates to an improvement of the electrolyte and positive electrode.

The recent advances in microelectronics technology have been remarkable and as is typically seen in memory backup power supplies for various electronic apparatuses, it is common practice today to accommodate batteries within the apparatus and to make an integral assembly with electronic devices and circuit. Under the circumstances, a need has arisen to reduce the size, weight and thickness of batteries and to increase their energy density. In the field of primary batteries, small and lightweight lithium batteries have already been commercialized but their utility is quite limited. This may be explained as follows: liquid electrolytes, in particular those which have ionic compounds dissolved in organic electrolytes, have conventionally been used with batteries that utilize an electrochemical reaction or other electrochemical devices such as electric double layer capacitors and electrochromic devices but such liquid electrolytes suffer from problems such as low long-term reliability and splashing in the sealing step because there is high likelihood of electrolyte leakage from parts of the battery and dissolution or evaporation of electrode materials.

With a view to improving the liquidtightness and long-term storage stability of electrochemical devices, ion-conductive high-molecular weight compounds having high ion conductivity have been reported and are still being studied as a means of solving those problems. The ion-conductive high-molecular weight compounds that are under the current review include straight-chained, reticular crosslinked or comb-shaped homopolymers or copolymers comprising ethylene oxide as building blocks. With a specific purpose of increasing the ion conductivity at low temperatures, it has been proposed that crystallization be prevented by using reticular crosslinked or comb-shaped polymers and this idea has already been implemented. In particular, ion-conductive high-molecular weight compounds using such reticular crosslinked polymers are useful since they have high mechanical strength and good ion conductivity at low temperatures.

When one wants to use those ion-conductive high-molecular weight compounds as electrolyte in electrochemical devices, it is necessary to reduce the thickness of the electrolyte in order to lower the internal resistance. In the case of ion-conductive high-molecular weight compounds, thin films of uniform thickness can be easily worked into a desired shape but not all methods are completely satisfactory for use in practical applications. Examples of the methods that have so far been proposed include: i) casting a solution of an ion-conductive high-molecular weight compound and removing the solvent by evaporation; ii) coating a polymeric monomer or macromer onto a substrate and polymerizing it thermally; and iii) curing an ion-conductive high-molecular weight compound by exposure to active radiation. The second method (thermal polymerization) is convenient and has been used most commonly. However, the time required to complete thermal polymerization is very long, making it difficult to accelerate the production rate. Further, a temperature gradient tends to develop in the heating furnace and the need to heat in an inert gas atmosphere has unavoidably increased the size of the heating furnace and associated equipment.

SUMMARY OF THE INVENTION

The present invention has been accomplished under these circumstances and has as an object providing a battery of a type that uses an ion-conductive high-molecular weight compound and which is improved in that it can be fabricated with great ease, is entirely free from the possibility of electrolyte leakage and has high long-term reliability and safety.

This object of the present invention can be accomplished by a battery that comprises a negative electrode, a composite positive electrode composed of an ion-conductive high-molecular weight compound that has at least one ionic compound dissolved therein and that has a polyether structure and ion conductivity, an electrochemically active material and, optionally, an electron conductive material, and an electrolyte made of an ion-conductive high-molecular weight compound that has at least one ionic compound dissolved therein and that has a polyether structure and ion conductivity, which battery is characterized in that said composite positive electrode and said electrolyte are formed by exposure to an active radiation such as ultraviolet rays or ionizing radiation.

In a preferred embodiment, each of said ion-conductive high-molecular weight compounds is a polyether having a reactive double bond that has at least one ionic compound dissolved therein and it will acquire a cross-linked network structure upon reaction by exposure to said active radiation.

In another preferred embodiment, an electron beam may be used as the active radiation and it is applied at an acceleration voltage of at least 100 kV.

In yet preferred embodiment, each of said ion-conductive high-molecular weight compounds contains a material that is capable of dissolving ionic compounds.

The present invention attains its objective by providing a battery that uses a composite positive electrode made of a mixture of said electrochemically active material and said ion-conductive high-molecular weight compound.

DETAILED DESCRIPTION OF THE INVENTION

Figure 1:
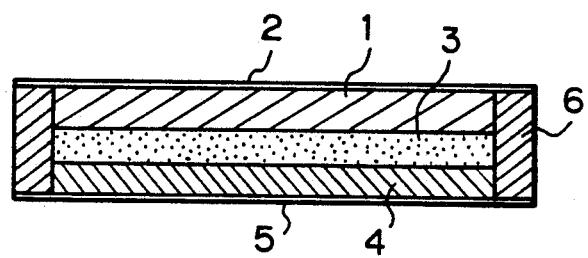
FIG. 1 is a cross-sectional view of a battery in sheet form according to an embodiment of the present invention.

An ion-conductive high-molecular weight compound having a metal salt dissolved in a high-molecular weight compound that is the crosslinking product of polyether is such that the high-molecular weight compound is crosslinked as a result of it undergoing ether linkage by a polyether having a polyfunctional hydroxyl group and a diacrylate.

It is known that α,β-unsaturated carbonyl compounds such as acrylates react with functional groups having active hydrogen such as a hydroxyl group, an amino group and a mercapto group to form addition compounds (the reaction is known as the Michael addition reaction). If this reaction is applied for reacting a diacrylate with a polyol having a hydroxyl group of tri- and higher valencies, a three-dimensional polymer crosslinked by ether linkage will be produced as a result of the Michael addition reaction.

The three-dimensional polyether produced by the reaction between a diacrylate and a polyether having polyfunctional hydroxyl groups is capable of having a metal salt such as an alkali metal salt dissolved in its crosslinked structure. In addition, this polyether is a crosslinked polymer produced by ether linkage, so its structure is free from intermolecular hydrogen bonds and has a low glass transition point, thus permitting dissolved metal ions to migrate very easily.

The polyether having a polyfunctional hydroxyl group may be exemplified by, but are not limited to, a polyether obtained by reaction between glycerin and ethylene oxide and a polyether obtained by reaction between glycerin and propylene oxide.

Exemplary diacrylates that can be used are aliphatic or aromatic diacrylates derived from glycol or diphenol and they include diethylene glycol diacrylate, triethylene glycol diacrylate, hydroquinone diacrylate, etc.

Also useful are those polymers having a crosslinked network structure which are produced by performing reaction on mixtures of dimethacrylic or diacrylic acid esters of ethylene oxide and monomethacrylic or monoacrylic acid esters of polyether.

In the present invention, the high-molecular weight compounds of a crosslinked network structure are formed by reaction involving exposure to an active radiation such as ultraviolet rays or ionizing radiation. Since this method is capable of completing the necessary processing within a short time at low temperature, it offers the advantage that a desired battery can be fabricated with a much higher efficiency than when the conventional thermal polymerization method is adopted.

Various ionic compounds may be contained in the high-molecular weight compounds thus obtained and they include: inorganic ion salts containing one of Li, Na and K, as exemplified by $LiClO_4$, $LiSCN$, $LiBF_4$, $LiAsF_6$, $LiCF_3$, $SO_3$, $LiCF_3CO_2$, $NaI$, $NaSCN$, $NaBr$ and $KSCN$; and organic ion salts as exemplified by quaternary ammonium salts such as $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate and $(C_2H_5)_4N$-phthalate, as well as lithium stearylsulfonate, sodium octylsulfonate and lithium dodecylbenzenesulfonate. These ionic compounds may be used either alone or in admixtures.

The ionic compounds are used in such proportions that 0.0001-5.0 moles, preferably 0.005-2.0 moles, of them are present per oxygen atom in the ion-conductive high-molecular weight compound that has undergone ether linkage. If the ion compounds are used in undesirably large amounts, the excess portion of the ionic compound such as inorganic ion salt will not be dissociated but it will simply exist as part of the mixture with the ion-conductive high-molecular weight compound and the ion conductivity of the latter will decrease rather than increase.

There is no particular limitation on the method by which the ionic compounds can be incorporated in the ion-conductive high-molecular weight compound. To name just one example, the ionic compound may be dissolved in an organic solvent such as methyl ethyl ketone (MEK) or tetrahydrofuran (THF) and the solution is mixed uniformly with the ion-conductive high-molecular weight compound, followed by removing the organic solvent under vacuum.

If desired, a material that is capable of dissolving the ionic compound may be contained in the ion-conductive high-molecular weight compound and this helps achieve a marked improvement in conductivity without changing the basic structure of the high-molecular weight compound.

Exemplary materials that are capable of dissolving the ionic compound include, but are not limited to, cyclic carbonate esters such as propylene carbonate and ethylene carbonate, cyclic esters such as γ-butyrolactone, tetrahydrofuran or derivatives thereof, ethers such as 1,3-dioxane and 1,2-dimethoxyethane, nitriles such as acetonitrile and benzonitrile, dioxolan or derivatives thereof, sulfolane or derivatives thereof. These materials may be used either alone or in admixtures. They may be incorporated in any proportions by any methods.

The ion-conductive high-molecular weight compound to be used in the present invention is preferably coated in a uniform thickness and coating methods that can be used for this purpose include, but are not limited to, roller coating by means of applicator rolls, screen coating, doctor blade coating, spin coating and bar coating.

The active materials that may be used in forming the composite positive electrode in the battery of the present invention include, but are not limited to, the following electrode materials: compounds of group I metals such as $CuO$, $Cu_2O$, $Ag_2O$, $CuS$ and $CuSO_2$, compounds of group IV metals such as $TiS_2$, $SiO_2$ and $SnO$, compounds of group V metals such as $V_2O_5$, $V_6O_{12}$, $VO_x$, $Nb_2O_5$, $Bi_2O_3$ and $Sb_2O_3$, compounds of group VI metals such as $CrO_3$, $Cr_2O_3$, $MoO_3$, $MoS_2$, $WO_3$ and $SeO_2$, compounds of group VII metals such as $MnO_2$ and $Mn_2O_3$, compounds of group VIII metals such as $Fe_2O_3$, $FeO$, $Fe_3O_4$. $Ni_2O_3$, $NiO$, $CoO_3$ and $CoO$, other metal compounds represented by the general formulas $Li_xMX_y$ and $Li_xMN_yX_2$ (M and N are each a metal selected from among groups I-VIII of the periodic table; X is a chalcogen such as oxygen or sulfur), electroconductive high-molecular weight compounds such as polypyrrole, polyaniline, polyparaphenilene, polyacetylene and polyacene materials, and carbonaceous material having a pseudo-graphite structure.

The composite positive electrode is preferably coated in a uniform thickness and coating methods that can be used for this purpose include, but are not limited to, roller coating by means of applicator rolls, screen coating, doctor blade coating, spin coating and bar coating.

The active materials that may be used in forming the negative electrode in the battery of the present invention include, but are not limited to, the following electrode materials: lithium metal, lithium alloys such as lithium-aluminum, lithium-lead, lithium-tin, lithium-aluminum-tin, lithium-gallium and Wood's metal, and carbonaceous materials such as carbon. Also useful are those which can be used as the active materials for the composite positive electrode that are already described above.

If necessary, carbon such as acetylene black or a conductive material such as a metal powder may be mixed with the positive electrode to provide better electron conductivity.

When preparing the composite positive electrode, more than one type of dispersants and dispersion media may be added in order to obtain a homogeneous system of mixed dispersion.

A separator can be prepared by either one of the following two methods: a sheet solely made of the ion-conductive high-molecular weight compound may be disposed between the composite positive electrode and the negative electrode; alternatively, a liquid composition of the ion-conductive high-molecular weight compound may be coated on the composite positive electrode or the negative electrode and cured to form an integral assembly.

In accordance with the present invention, the composite positive electrode which is composed of an ion-conductive high-molecular weight compound that has at least one ionic compound dissolved therein and that has a polyether structure and ion conductivity, an electrochemically active material and, optionally, an electron conductive material, and the electrolyte which is made of an ion-conductive high-molecular weight compound that has at least one ionic compound dissolved therein and that has a polyether structure and ion conductivity are formed by exposure to an active radiation such as ultraviolet rays or ionizing radiation. This permits the necessary processing to be completed at low temperature within a short time and, hence, a desired battery can be fabricated with a much higher efficiency than when the conventional thermal polymerization method is adopted, whereby products of high consistency in quality can be obtained.

Another advantage of forming the composite positive electrode and the electrolyte by exposure to an active radiation such as ultraviolet rays or ionizing radiation is that the degree of crosslinking of the ion-conductive high-molecular weight compounds can be controlled so easily that when forming various types of composite positive electrode and electrolyte, products that are electrochemically optimal can be fabricated by controlling the amount of exposure to active radiations.

The following examples are provided for the purpose of further illustrating the present invention but are in no way to be taken as limiting.

EXAMPLE 1

A battery in sheet form was fabricated in accordance with the following procedure.

a) Manganese dioxide (active material for the positive electrode), acetylene black (conductivity imparting agent) and an organic polymer which was a 7:3 mixture of a dimethacrylic acid ester of ethylene oxide (mol. wt., 4000) and a monomethacrylic acid ester of methoxylated polyethylene glycol (mol. wt., 400) were mixed to prepare a composite positive electrode by the following method: manganese dioxide and acetylene black were mixed at a weight ratio of 85:15; to the mixture, 10 parts by weight of the organic polymer as mixed with 1 part by weight of lithium perchlorate and 20 parts by weight of propylene carbonate was added and the two main components were mixed together in a dry inert gas atmosphere at a weight ratio of 10:3; the resulting blend was cast onto a current collector having a conductive carbon coat formed on the surface of a positive plate made of stainless steel; thereafter, the casting was cured by exposure to an electron beam in an inert gas atmosphere at an acceleration voltage of 250 kV for a total dose of 8 Mrad; the composite positive electrode coat formed on the stainless steel current collector was 60 μm thick.

b) Lithium metal used as the active material for the negative electrode of battery was compressed against a negative plate also made of stainless steel.

Subsequently, in order to form a layer of the ion-conductive high-molecular weight compound of the present invention over the lithium metal coat, a mixture of the organic polymer described above (30 parts by weight), lithium perchlorate (6 parts by weight) and propylene carbonate (64 parts by weight) was cast onto the lithium metal coat and cured by exposure to an electron beam in an inert gas atmosphere at an acceleration voltage of 250 kV for a total dose of 6 Mrad. The thus formed electrolyte layer was 20 μm thick.

c) A battery in sheet form was fabricated by bringing the combination of electrolyte, lithium and negative current collector as prepared in step b) into contact with the combination of positive current collector and composite positive electrode as prepared in step a).

FIG. 1 is a cross-sectional view of the battery in sheet form that was fabricated in Example 1. Shown by 1 in the figure is the positive current collector made of stainless steel and shown by 2 is the composite positive electrode in which manganese dioxide was used as the active material for positive electrode, acetylene black as the conductivity imparting agent, and the organic polymer having a dimethacrylic acid ester of ethylene oxide mixed with a monomethacrylic acid ester of methoxylated polyethylene glycol was used as the binder. Shown by 3 is the electrolyte layer made of the ion-conductive high-molecular weight compound of the present invention. Shown by 4 is metallic lithium, and 5 is the negative current collector made of stainless steel, which also serves as a jacket. Shown by 6 is the sealing compound made of a modified polypropylene.

COMPARATIVE EXAMPLE 1

A comparative battery in sheet form was fabricated in accordance with the following procedure.

a) Manganese dioxide (active material for the positive electrode) and acetylene black (conductivity imparting agent) were mixed with the same organic polymer as used in Example 1 to prepare a composite positive electrode by the following method: manganese dioxide and acetylene black were mixed at a weight ratio of 85:15; to the mixture, 10 parts by weight of the organic polymer as mixed with 1 part by weight of lithium perchlorate, 0.05 part by weight of azobisisobutyronitrile and 20 parts by weight of polypropylene carbonate was added and the two main components were mixed together in a dry inert gas atmosphere at a weight ratio of 10:3; the resulting blend was cast onto a current collector having a conductive carbon coat formed on the surface of a positive plate made of stainless steel; thereafter, the casting was left to stand in an inert gas atmosphere at 100° C. for 1 h to cure; the composite positive electrode coat formed on the stainless steel current collector was 60 μm thick.

b) Lithium metal used as the active material for the negative electrode of battery was compressed against a negative plate also made of stainless steel.

Subsequently, in order to form a layer of the ion-conductive high-molecular weight compound of the present invention over the lithium metal coat, a mixture of the organic polymer described above (30 parts by weight), lithium perchlorate (6 parts by weight), azobisisobutyronitrile (0.05 part by weight) and propylene carbonate (64 parts by weight) was cast onto the lithium metal coat and left to stand in an inert gas atmosphere at 100° C. for 1 h to cure. The thus formed electrolyte layer was 20 μm thick.

c) A battery in sheet form was fabricated by bringing the combination of electrolyte, lithium and negative current collector as prepared in step b) into contact with the combination of positive current collector and composite positive electrode as prepared in step a).

The area of the electrodes in the batteries to be fabricated can be modified variously by changing the fabrication process. In Example 1 and Comparative Example 1, the electrode area was set to 100 cm$^2$.

Figure 2:
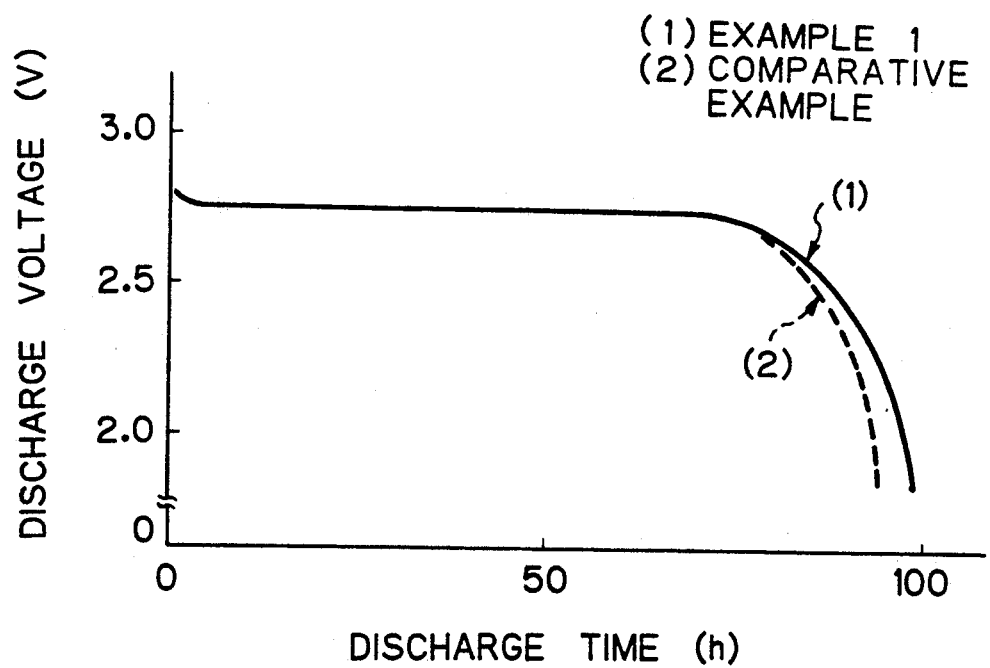
FIG. 2 is a graph showing the initial discharge characteristics of the batteries in sheet form of Example 1 and Comparative Example 1, as obtained when they were discharged at 20° C. with a load of 3 k$\Omega$.

The initial discharge characteristics of the batteries fabricated in Example 1 and Comparative Example 1 were investigated by discharging them at 25° C. under a load of 3 kΩ after assembling and the results are shown in FIG. 2. As one can see from FIG. 2, the battery of Example 1 had better initial discharge characteristics than the battery of Comparative Example 1.

EXAMPLE 2

A battery in sheet form was fabricated in accordance with the following procedure.

a) Vanadium pentoxide (active material for the positive electrode), acetylene black (conductivity imparting agent) and an organic polymer which was 7:3 mixture of a dimethacrylic acid ester of ethylene oxide (mol. wt., 4000) and a monomethacrylic acid ester of methoxylated polyethylene glycol (mol. wt., 400) were mixed to prepare a composite positive electrode by the following method: vanadium pentoxide and acetylene black were mixed at a weight ratio of 85:15; to the mixture, 10 parts of the organic polymer as mixed with 1 part by weight of lithium hexafluoroarsenate, 10 parts by weight of ethylene carbonate and 10 parts by weight of 2-methyltetrahydrofuran was added and the two main components were mixed together in a dry inert gas atmosphere at a weight ratio of 10:3; the resulting blend was cast onto a current collector having a conductive carbon coat formed on the surface of a positive plate made of stainless steel; thereafter, the casting was cured by exposure to an electron beam in an inert gas atmosphere at an acceleration voltage of 250 kV for a total dose of 7.5 Mrad; the composite positive electrode coat formed on the stainless steel current collector was 60 μm thick.

b) Lithium metal used as the active material for the negative electrode of battery was compressed against a negative plate also made of stainless steel.

Subsequently, in order to form a layer of the ion-conductive high-molecular weight compound of the present invention over the lithium metal coat, a mixture of the organic polymer described above (30 parts by weight), lithium hexafluoroarsenate (6 parts by weight), ethylene carbonate (32 parts by weight) and 2-methyltetrahydrofuran (32 parts by weight) was cast onto the lithium metal coat and cured by exposure to an electron beam in an inert gas atmosphere at an acceleration voltage of 250 kV for a total dose of 5 Mrad. The thus formed electrolyte layer was 20 μm thick.

c) A battery in sheet form was fabricated by bringing the combination of electrolyte, lithium and negative current collector as prepared in step b) into contact with the combination of positive current collector and composite positive electrode as prepared in step a).

COMPARATIVE EXAMPLE 2 a) Vanadium pentoxide (active material for the positive electrode), and acetylene black (conductivity imparting agent) and an organic polymer which was a 7:3 mixture of a dimethacrylic acid ester of ethylene oxide (mol. wt., 4000) and a monomethacrylic acid ester of methoxylated polyethylene glycol (mol. wt., 400) were mixed to prepare a composite positive electrode by the following method: vanadium pentoxide and acetylene black were mixed at a weight ratio of 85:15; to the mixture, 10 parts of the organic polymer as mixed with 1 part by weight of lithium hexafluoroarsenate, 0.05 part by weight of azobisisobutyronitrile, 10 parts by weight of ethylene carbonate and 10 parts by weight of 2-methyltetrahydrofuran was added and the two main components were mixed together in a dry inert gas atmosphere at a weight ratio of 10:3; the resulting blend was cast onto a current collector having a conductive carbon coat formed on the surface of a positive plate made of stainless steel; thereafter, the casting was left to stand in an inert gas atmosphere at 100° C. for 1 h to cure; the composite positive electrode coat formed on the stainless steel current collector was 60 μm thick.

b) Lithium metal used as the active material for the negative electrode of battery was compressed against a negative plate also made of stainless steel.

Subsequently, in order to form a layer of the ion-conductive high-molecular weight compound of the present invention over the lithium metal coat, a mixture of the organic polymer described above (30 parts by weight), lithium hexafluoroarsenate (6 parts by weight), azobisisobutyronitrile (0.05 part by weight), ethylene carbonate (32 parts by weight) and 2-methyltetrahydrofuran (32 parts by weight) was cast onto the lithium metal coat and left to stand in an inert gas atmosphere at 100° C. for 1 h to cure. The thus formed electrolyte layer was 20 μm thick.

c) A battery in sheet form was fabricated by bringing the combination of electrolyte, lithium and negative current collector as prepared in step b) into contact with the combination of positive current collector and composite positive electrode as prepared in step a).

Figure 3:
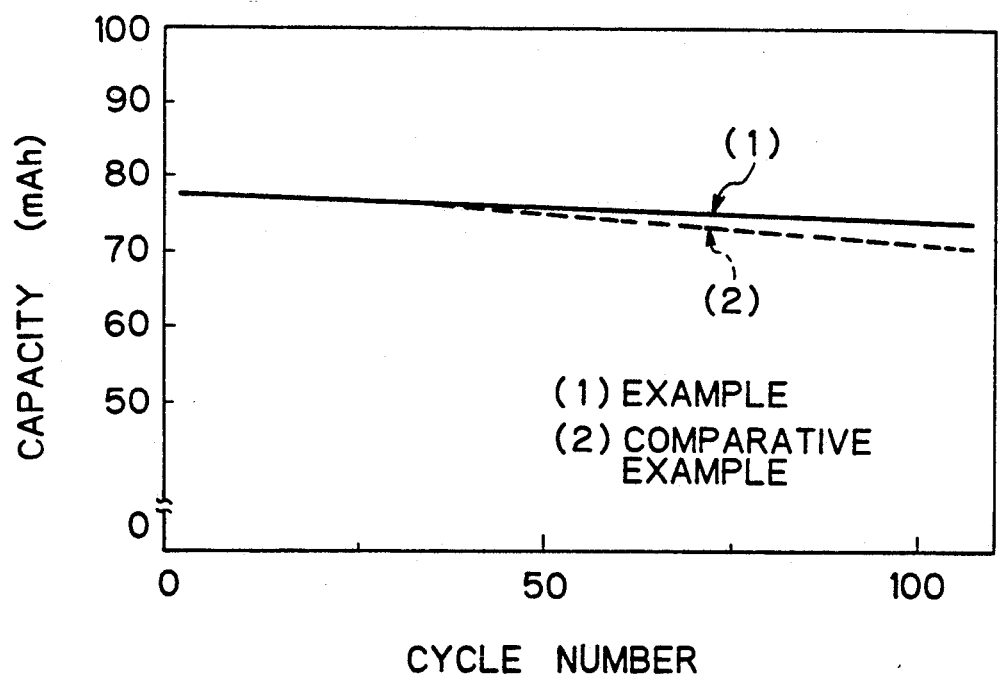
FIG. 3 is a graph showing the capacity vs cycle number of the batteries in sheet form of Example 2 and Comparative Example 2.

The area of the electrodes in the batteries to be fabricated can be modified variously by changing the fabrication process. In Example 2 and Comparative Example 2, the electrode area was set to 100 cm$^2$. The batteries were subjected to a cycle life test at 25° C. by a constant current (100 μA) discharge method, with the final charging voltage and the cutoff voltage of discharge being set at 3.2 V and 2.0 V, respectively. The test results are shown in FIG. 3 in terms of the relationship between cycle number and battery capacity. As one can see from FIG. 3, the battery in sheet form that was fabricated by using the solid polymer electrolyte of the present invention had better cycle characteristics than the comparative battery.

As is clear from the foregoing discussion, the battery of the present invention is characterized in that the composite positive electrode which is composed of an ion-conductive high-molecular weight compound that is composed of a polymeric material having at least one ionic compound dissolved therein, an electrochemically active material and, optionally, an electron conductive material, and the electrolyte which is made of an ion-conductive high-molecular weight compound composed of a polymeric material having at least one ionic compound dissolved therein are formed by exposure to an active radiation such as ultraviolet rays or ionizing radiation. This permits the necessary processing to be completed at low temperature within a short time and, hence, a desired battery can be fabricated with a much higher efficiency than when the conventional thermal polymerization method is adopted, whereby products of high consistency in quality can be obtained. Hence, the present invention offers the advantage that batteries of improved performance can be fabricated by an efficient process.

What is claimed is:

1. A battery, said battery comprising:

a negative electrode, a composite positive electrode which is composed of an ion-conductive high-molecular weight compound that has at least one ionic compound dissolved therein and that has a polyether structure and ion conductivity, an electrochemically active material and, optionally, an electron conductive material, and an electrolyte which is made of an ion-conductive high-molecular weight compound that has at least one ionic compound dissolved therein and that has a polyether structure and ion conductivity, wherein the high-molecular weight compound of said composite positive electrode and said electrolyte has a crosslinked network structure consisting of an ether linkage by a polyether having a polyfunctional hydroxyl group and a diacrylate upon reaction by exposure to an active radiation such as ultraviolet rays or ionizing radiation.

2. A battery according to claim 1 wherein each of said ion-conductive high-molecular weight compound is a polyether having a reactive double bond that has at least one ionic compound dissolved therein and it will acquire a crosslinked network structure upon reaction by exposure to said active radiation.

3. A battery according to claim 1 or 2 wherein an electron beam is used as the active radiation and applied at an acceleration voltage of at least 100 kV.

4. A battery according to claims 1, 2 or 3 wherein each of said ion-conductive high-molecular weight compounds contains a material that is capable of dissolving ionic compounds.

* * * * *